United States Patent
Rarig et al.

(10) Patent No.: US 8,603,220 B2
(45) Date of Patent: Dec. 10, 2013

(54) PRESSURE SWING ADSORPTION SYSTEM WITH INDEXED ROTATABLE MULTI-PORT VALVES

(75) Inventors: David Lester Rarig, Emmaus, PA (US); Roger Dean Whitley, Allentown, PA (US); Matthew James Labuda, Fogelsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 628 days.

(21) Appl. No.: 12/889,542

(22) Filed: Sep. 24, 2010

(65) Prior Publication Data

US 2011/0023712 A1    Feb. 3, 2011

Related U.S. Application Data

(62) Division of application No. 11/751,866, filed on May 22, 2007, now Pat. No. 7,854,793.

(60) Provisional application No. 60/817,715, filed on Jun. 30, 2006.

(51) Int. Cl.
*B01D 59/26* (2006.01)

(52) U.S. Cl.
USPC ................................................ 95/96; 95/148

(58) Field of Classification Search
USPC .................................. 96/116, 124, 130, 143
See application file for complete search history.

(56) References Cited

U.S. PATENT DOCUMENTS

| | | |
|---|---|---|
| 2,985,589 A | 5/1961 | Broughton et al. |
| 3,166,098 A | 1/1965 | Jennings |
| 3,430,418 A | 3/1969 | Wagner |
| 4,193,580 A | 3/1980 | Norris et al. |
| 4,272,265 A | 6/1981 | Snyder |
| 4,355,659 A | 10/1982 | Kelchner |
| 4,406,675 A | 9/1983 | Dangieri et al. |
| 4,569,371 A | 2/1986 | Dolejs et al. |
| 4,614,204 A | 9/1986 | Dolejs |
| 4,659,501 A | 4/1987 | Sugimori et al. |
| 4,877,429 A | 10/1989 | Hunter |
| 5,256,174 A | 10/1993 | Kai et al. |
| 5,328,503 A | 7/1994 | Kumar et al. |
| 5,330,561 A | 7/1994 | Kumar et al. |

(Continued)

FOREIGN PATENT DOCUMENTS

| | | |
|---|---|---|
| EP | 0177173 | 7/1990 |
| EP | 1420197 | 5/2004 |
| EP | 1752204 | 2/2007 |
| GB | 2190014 | 11/1987 |

*Primary Examiner* — Robert A Hopkins
(74) *Attorney, Agent, or Firm* — Willard Jones II

(57) ABSTRACT

Pressure swing adsorption system comprising two or more vessels, each having a feed end, a product end, and adsorbent material adapted to adsorb one or more components from a multi-component feed gas mixture; piping adapted to (1) introduce the feed gas mixture into the feed ends, withdraw a product gas from the product ends, and withdraw a waste gas from the feed ends of the vessels, and (2) place the product ends of any pair of vessels in flow communication; a feed pipe adapted to supply the feed gas mixture to the system; a product pipe adapted to withdraw the product gas from the system; and a waste gas pipe adapted to withdraw the waste gas from the system. An indexed rotatable multi-port valve is adapted to place the product end of each vessel in sequential flow communication with the product end of each of the other vessels.

4 Claims, 5 Drawing Sheets

(56) References Cited

U.S. PATENT DOCUMENTS

| | | |
|---|---|---|
| 5,411,578 A | 5/1995 | Watson et al. |
| 5,565,104 A | 10/1996 | Priegnitz |
| 5,911,405 A | 6/1999 | Korczynski, Jr. et al. |
| 6,063,161 A | 5/2000 | Keefer et al. |
| 6,143,056 A | 11/2000 | Smolarek et al. |
| 6,311,719 B1 | 11/2001 | Hill et al. |
| 6,471,744 B1 | 10/2002 | Hill |
| 6,755,895 B2 | 6/2004 | Lomax, Jr. et al. |
| 6,936,091 B2 | 8/2005 | Bayreuther |
| 6,997,213 B1 | 2/2006 | Towler et al. |
| 7,059,349 B2 | 6/2006 | Breda |
| 7,066,204 B2 | 6/2006 | Marty |
| 7,160,367 B2 | 1/2007 | Babicki et al. |
| 2005/0132881 A1 | 6/2005 | Baksh et al. |

PRESSURE SWING ADSORPTION SYSTEM WITH INDEXED ROTATABLE MULTI-PORT VALVES

CROSS-REFERENCE TO RELATED APPLICATIONS

This is a divisional application of U.S. patent application Ser. No. 11/751,866 filed on May 22, 2007 which claims priority to U.S. Provisional Application No. 60/817,715 filed on Jun. 30, 2006. The entire contents of which are incorporated herein.

BACKGROUND OF THE INVENTION

Pressure swing adsorption (PSA) processes are widely used for the separation of gas mixtures based upon cyclic adsorption-desorption steps utilizing one or more vessels containing selective adsorbents that effect the desired separation. A PSA system typically comprises adsorbent vessels, compressors, vacuum pumps, multiple valves, piping, gas storage tanks, and a control system to operate the valves to provide the required cyclic process steps. Significant portions of the capital cost and operating maintenance expenses of PSA systems may be attributed to the multiple valves and control system required to operate these valves for the multiple cyclic steps in a PSA process.

PSA systems are competitive with cryogenic distillation systems for separating air to produce oxygen at capacities up to about 100 tons per day (TPD). Capital costs must be controlled and reduced for these PSA systems to remain competitive in view of changing market needs and increasing energy costs. As a result of recent improvements in adsorbent technology, oxygen PSA systems can be reduced in size and complexity to become transportable, and systems with product capacities up to 1 TPD can be transported easily on skids and commissioned at customer sites in minimal time. The modularization of these small PSA systems requires the reduction in component complexity, improved reliability, and lower capital cost.

There is a need in the art to simplify the valves and control systems in PSA systems, particularly in small modularized systems, in order to meet these requirements. This need is addressed by the embodiments of the invention disclosed below and defined by the claims that follow.

BRIEF SUMMARY OF THE EMBODIMENTS OF THE INVENTION

An embodiment of the invention relates to a pressure swing adsorption system comprising (a) two or more vessels, each vessel having a feed end, a product end, and adsorbent material adapted to adsorb one or more components from a multi-component feed gas mixture; (b) piping adapted to introduce the feed gas mixture into the feed ends of the vessels, piping adapted to withdraw a product gas from the product ends of the vessels, piping adapted to place the product ends of any pair of vessels in flow communication, and piping adapted to withdraw a waste gas from the feed ends of the vessels; (c) a feed pipe adapted to supply the feed gas mixture to the system, a product pipe adapted to withdraw the product gas from the system, and a waste gas pipe adapted to withdraw the waste gas from the system; and (d) an indexed rotatable multi-port valve adapted to place the product end of each vessel in sequential flow communication with the product end of each of the other vessels.

Another embodiment of the invention includes a pressure swing adsorption system comprising (a) first, second, third, and fourth vessels, each vessel having a feed end, a product end, and adsorbent material adapted to adsorb a selected component from a feed gas mixture; (b) piping adapted to introduce the feed gas mixture into the feed ends of the vessels, piping adapted to withdraw a product gas from the product ends of the vessels, piping adapted to place the product ends of any pair of vessels in flow communication, and piping adapted to withdraw a waste gas from the feed ends of the vessels; and (c) a feed pipe adapted to supply the feed gas mixture to the system, a product pipe adapted to withdraw the product gas from the system, and a waste gas pipe adapted to withdraw the waste gas from the system.

The system of this embodiment also includes an indexed rotatable multi-port product valve having eight indexed positions wherein (1) in a first indexed position the valve is adapted to place the product ends of the second and fourth vessels in flow communication;

(2) in a second indexed position the valve is adapted to place the product ends of the third and fourth vessels in flow communication and to place the product ends of the first and second vessels in flow communication;

(3) in a third indexed position the valve is adapted to place the product ends of the first and third vessels in flow communication;

(4) in a fourth indexed position the valve is adapted to place the product ends of the first and fourth vessels in flow communication and to place the product ends of the second and third vessels in flow communication;

(5) in a fifth indexed position the valve is adapted to place the product ends of the second and fourth vessels in flow communication;

(6) in a sixth indexed position the valve is adapted to place the product ends of the first and second vessels in flow communication and to place the product ends of the third and fourth vessels in flow communication;

(7) in a seventh indexed position the valve is adapted to place the product ends of the first and third vessels in flow communication; and (8) in an eighth indexed position the valve is adapted to place the product ends of the first and fourth vessels in flow communication and to place the product ends of the second and third vessels in flow communication.

A related embodiment of the invention includes a method for the recovery of a less strongly adsorbable component from a feed gas mixture comprising a more strongly adsorbable component and the less strongly adsorbable component, wherein the method comprises (a) providing a pressure swing adsorption system comprising
  (1) two or more vessels, each having a feed end, a product end, and adsorbent material adapted to adsorb the more strongly adsorbable component from the feed gas mixture;
  (2) piping adapted to introduce the feed gas mixture into the feed ends of the vessels, piping adapted to withdraw a product gas from the product ends of the vessels, wherein the product gas is depleted in the more strongly adsorbable component, piping adapted to place the product ends of any pair of vessels in flow communication, and piping adapted to withdraw a waste gas from the feed ends of the vessels, wherein the waste gas is enriched in the more strongly adsorbable component;

(3) a feed pipe adapted to supply the feed gas mixture to the system, a product pipe adapted to withdraw the product gas from the system, and a waste gas pipe adapted to withdraw waste gas from the system; and (4) an indexed rotatable multi-port product valve having a plurality of indexed rotational positions adapted to place the product ends of any pair of vessels in flow communication;

(b) introducing the feed gas mixture into a first vessel and withdrawing product gas from the first vessel and through the product pipe;

(c) depressurizing the first vessel by withdrawing depressurization gas from the product end of the vessel and transferring the depressurization gas to the feed end of another vessel via the indexed rotatable multi-port product valve in one of the indexed rotational positions;

(d) withdrawing waste gas from the feed end of the first vessel;

(e) pressurizing the first vessel by introducing into the product end of the vessel a depressurization gas provided from another vessel that is undergoing step (c), wherein the gas is transferred via the indexed rotatable multi-port product valve in another of the indexed rotational positions; and (f) repeating steps (b) through (e) in a cyclic manner.

Another related embodiment of the invention is an indexed rotatable multi-port valve comprising (a) a rotatable member adapted for rotation about an axis and having a first circular cross-section perpendicular to the axis, wherein the rotatable member has a non-planar outer surface and comprises one or more passages through the rotatable member; (b) a valve body surrounding the rotatable member, wherein the valve body is coaxial with the rotatable member and has a non-planar inner surface and an outer surface, and wherein the valve body comprises a plurality of passages between the inner surface and the outer surface; and (c) an indexing valve drive motor adapted to rotate the rotatable member intermittently in a single rotary direction to place the rotatable member sequentially in a series of fixed circumferential or rotational positions about the periphery of the circular cross-section relative to the valve body to align selected passages in the rotatable member with selected passages in the valve body.

A further embodiment relates to an indexed rotatable multi-port valve assembly comprising (a) a rotatable member adapted for rotation about an axis and having a first circular cross-section perpendicular to the axis, wherein the rotatable member comprises a first, a second, and a third passage through the rotatable member; (b) a valve body surrounding the rotatable member, wherein the valve body is coaxial with the rotatable member and has an inner surface and an outer surface, and wherein the valve body comprises first, second, third, and fourth passages between the inner surface and the outer surface; and (c) an indexing valve drive motor adapted to rotate the rotatable member intermittently in a single rotary direction to place the rotatable member sequentially in each of eight different circumferential positions about the periphery of the circular cross-section relative to the valve body to align selected passages in the rotatable member with selected passages in the valve body.

Another embodiment of the invention includes an indexed rotatable multi-port valve assembly comprising (a) a rotatable member adapted for rotation about an axis and having a first circular cross-section perpendicular to the axis, wherein the rotatable member has an outer surface, and wherein the rotatable member comprises (1) first, second, third, fourth, fifth, and sixth openings at the outer surface that are disposed about the periphery of the first circular cross-section, wherein the first opening and the second opening are separated by two equal arcs of 180 degrees around the periphery of the first circular cross-section, the third and fourth openings are disposed along one of the two equal arcs separating the first and second openings, the third opening is separated from the fourth opening by an arc of 90 degrees on the periphery, the third opening is separated from the first opening by an arc of 45 degrees on the periphery, and the fourth opening is separated from the second opening by an arc of 45 degrees on the periphery, and the fifth and sixth openings are disposed along the other of the two equal arcs separating the first and second openings, the fifth opening is separated from the sixth opening by an arc of 90 degrees on the periphery, the fifth opening is separated from the first opening by an arc of 45 degrees on the periphery, and the sixth opening is separated from the second opening by an arc of 45 degrees on the periphery, and (2) a first passage through the rotatable member connecting the first opening with the second opening, a second passage through the rotatable member connecting the third opening with the fourth opening, and a third passage through the rotatable member connecting the fifth opening with the sixth opening;

(b) a valve body surrounding the rotatable member, wherein the valve body is coaxial with the rotatable member and has a second circular cross-section that is perpendicular to the axis of the rotatable member, a periphery of the second circular cross-section that is co-planar with the periphery of the first circular cross-section of the rotatable member, an inner surface, and an outer surface, and wherein the valve body comprises (1) first, second, third, and fourth openings at the inner surface that are disposed about the periphery of the second circular cross-section, wherein each opening is separated from each adjacent opening by an arc of 90 degrees on this periphery;

(2) first, second, third, and fourth openings at the outer surface of the housing, and (3) a first passage through the valve body connecting the first opening at the inner surface with the first opening at the outer surface, a second passage through the valve body connecting the second opening at the inner surface with the second opening at the outer surface, a third passage through the valve body connecting the third opening at the inner surface with the third opening at the outer surface, and a fourth passage through the valve body connecting the fourth opening at the inner surface with the fourth opening at the outer surface; and (c) an indexing valve drive motor adapted to rotate the rotatable member intermittently in a single rotary direction to place the rotatable member sequentially in each of eight different circumferential positions about the periphery of the circular cross-section relative to the valve body to align selected passages in the rotatable member with selected passages in the valve body.

DETAILED DESCRIPTION OF THE INVENTION

Figure 1:
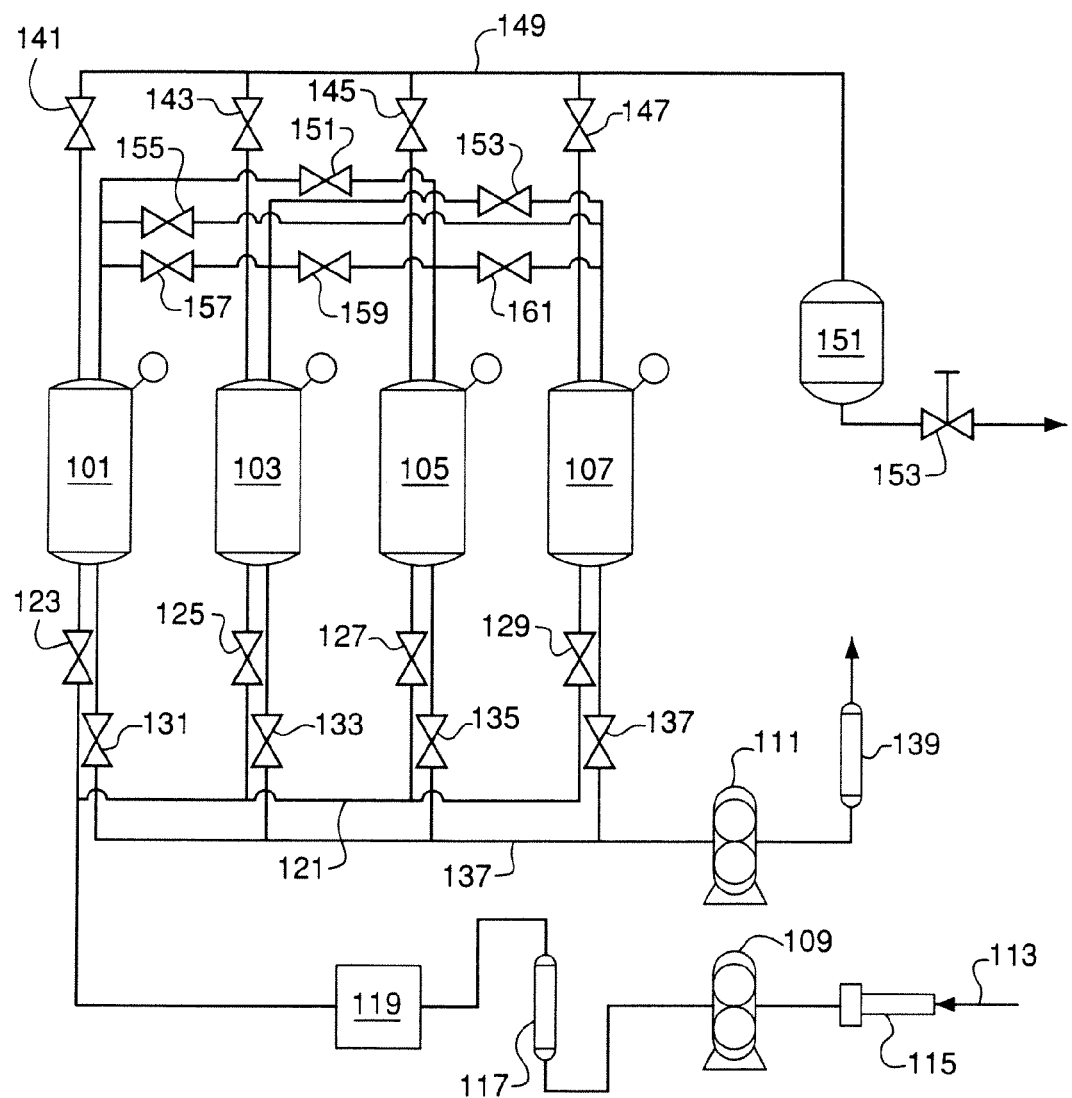
FIG. 1 is a schematic flow diagram of an exemplary four-bed pressure swing adsorption system.

The embodiments of the invention described herein simplify the valving and valve control system used in a typical PSA process. Many PSA systems utilize multiple adsorbent vessels having gas inlet and outlet manifolds with multiple block valves that are opened and closed for controlled time periods during the process cycle. A typical four-bed PSA system known in the art is illustrated in FIG. 1 wherein selective adsorbent material is contained in adsorbent vessels 101, 103, 105, and 107, feed gas is introduced into the system by feed blower 109, and waste gas is withdrawn from the system by vacuum blower 111. Inlet air via line 113 is filtered in filter 115, and the compressed feed gas from blower 109 passes through silencer 117 and is cooled in aftercooler 119. Feed gas is provided via feed manifold 121 and block valves 123, 125, 127, and 129 to the feed ends of adsorbent vessels 101, 103, 105, and 107, respectively. Waste gas is withdrawn from the feed ends of the adsorbent vessels through switching valves 131, 133, 135, and 137 and waste gas manifold 137, and vacuum blower 111 discharged waste gas through silencer 139.

Product gas is withdrawn via block valves 141, 143, 145, and 147 from the product ends of adsorbent vessels 101, 103, 105, and 107, respectively. Product gas passes through product manifold 149 to product tank 151, from which it is provided to the consumer via flow control valve 153. Gas transfer between adsorbent vessels 101 and 105 flows through connecting piping and block valve 151, gas transfer between adsorbent vessels 103 and 107 flows through connecting piping and block valve 153, gas transfer between adsorbent vessels 101 and 107 flows through connecting piping and block valve 155, gas transfer between adsorbent vessels 101 and 103 flows through connecting piping and block valve 157, gas transfer between adsorbent vessels 103 and 105 flows through connecting piping and block valve 159, and gas transfer between adsorbent vessels 105 and 107 flows through connecting piping and block valve 161.

There are several features in the PSA system of FIG. 1 that may contribute to high capital expense and complicated operating problems. First, there are 18 switching block valves operated by individual electronic or pneumatic actuators that are typically controlled by a programmable logic controller (PLC) or computer control system. Second, small differences among the actuation times for the multiple block valves can escalate into significant differences after long periods of operating time. This is of particular concern in rapid PSA cycles because these time differences can become larger fractions of the cycle step time durations. Additional logic would be required in the controller to autocorrect this problem. Third, the switching block valves have moving parts that would need replacement over time as they wear, some at different rates than others.

As an alternative to using the multiple block valves shown in FIG. 1, rotary valves have been developed in the art for directing gas flow to, from, and between the beds of a multiple-bed PSA system to effect the required cycle steps. A rotary valve comprises a rotor and a stator, each having multiple internal arcuate passages and/or ports that are aligned in different positions as the rotor turns continuously to direct gas flow for the PSA cycle. The rotor and stator typically have highly-polished surfaces between which continuous sliding contact is made to form a leak-tight gas seal. While rotary valves can replace numerous switching block valves in a PSA system, rotary valves are expensive and tend to be fairly complex, especially when used in a PSA system with more than two beds that operate with multiple bed-to-bed gas transfer steps. Also, rotary valves may have higher rates of leakage due to imbalancing and wear compared with more traditional switching valves.

The embodiments of the present invention provide alternatives to the use of multiple switching valves and rotary valves in multi-vessel PSA systems by utilizing indexed rotatable multi-port valves at the feed and product ends of the adsorbent vessels. An indexed rotatable multi-port valve is defined as a valve comprising a rotatable member disposed within a valve body wherein the rotatable member and the valve body are coaxial and have circular cross sections in any plane perpendicular to the axis. The outer surface of the rotatable member and the inner surface of the valve body are non-planar. The rotatable member and the valve housing each has a plurality of passages wherein selected combinations of the passages in the member and body are placed in flow communication when the member is set at respective specific indexed circumferential positions.

Rotation of the rotatable member is intermittent and the valve is indexed, which means that rotation occurs only to change the circumferential position of the member and no rotation occurs while the member is in a fixed indexed circumferential position. Each fixed circumferential position of the rotatable member is considered an indexed position relative to the valve body, and the rotatable member returns to a given indexed position during each revolution about its axis.

The terms "flow communication" and "in flow communication with" as applied to a first and a second region mean that fluid can flow from the first region to the second region, and/or from the second region to the first region, through an intermediate region. The intermediate region may comprise connecting piping and valves between the first and second regions.

The term "sequential" has the usual meaning of relating to or arranged in a sequence. When applied to the use of an indexed rotatable multi-port valve in a pressure swing adsorption system, the term relates to a repeatable series of fixed positions of the rotatable member of the valve as it is rotated intermittently between the positions. The term also applies to the steps in a pressure swing adsorption cycle wherein each step follows the same preceding step in a cyclically repeating series of steps. The term "sequential flow communication" as applied to the product end of an adsorbent vessel means that the product end of that vessel is placed in flow communication in turn with each of the other vessels in the steps of a PSA operating cycle.

The term "rotatable" refers to a valve member having an axis about which the member can be rotated discontinuously or intermittently between positions wherein the member remains in a fixed position between periods of rotational movement from one position to the next sequential position. The term "indexed" means that the positions are fixed relative to one another.

The generic term "pressure swing adsorption" (PSA) as used herein applies to all adsorptive separation systems operating between a maximum and a minimum pressure. The maximum pressure typically is superatmospheric, and the minimum pressure may be super-atmospheric, atmospheric, or sub-atmospheric. When the minimum pressure is sub-atmospheric and the maximum pressure is superatmospheric, the system typically is described as a pressure vacuum swing adsorption (PVSA) system. When the maximum pressure is at or below atmospheric pressure and the minimum pressure is below atmospheric pressure, the system is typically described as a vacuum swing adsorption (VSA) system.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity.

Figure 2:
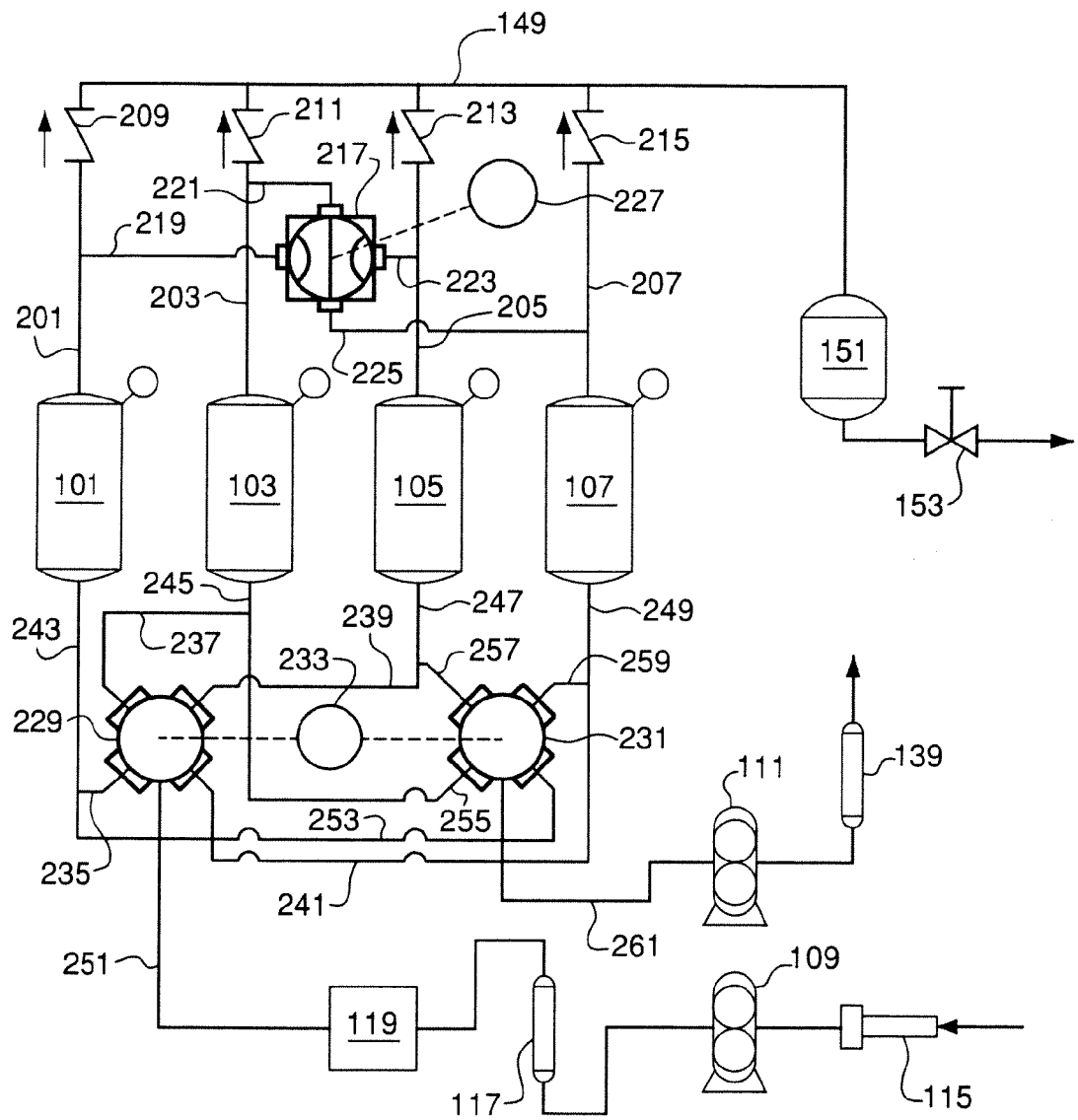
FIG. 2 is a schematic flow diagram of an exemplary four-bed pressure swing adsorption system according to an embodiment of the present invention.

One embodiment is illustrated in FIG. 2 wherein indexed rotatable multi-port valves are used to replace the block valves of the system in FIG. 1. The system of FIG. 2 uses certain common components of FIG. 1, namely, adsorbent vessels 101, 103, 105, and 107, feed blower 109, vacuum blower 111, filter 115, silencer 117, aftercooler 119, waste gas manifold 137, silencer 139, product tank 151, and control valve 153. Outlet lines 201, 203, 205, and 207 from adsorbent vessels 101, 103, 105, and 107, respectively, are connected to product manifold 149 via check valves 209, 211, 213, and 215, respectively. Product tank 151 may be filled with an oxygen-selective adsorbent in order to increase the effective gas storage density within the product tank, thereby reducing tank size and pressure fluctuations in the product delivery pressure.

Gas flows between the product ends of the adsorbent vessels are directed by indexed rotatable multi-port valve 217, which has four external ports connected via lines 219, 221, 223, and 225, respectively, to outlet lines 201, 203, 205, and 207 from adsorbent vessels 101, 103, 105, and 107, respectively. As described later, indexed rotatable multi-port valve 217 has an internal rotatable member having internal passages adapted to place specific pairs of lines 219, 221, 223, and 225 in flow communication according to the PSA cycle operating in adsorbent vessels 101, 103, 105, and 107. The rotatable internal member is rotated by indexing valve drive motor 227 (not shown), which moves the member intermittently in a single rotary direction with precise 45 degree increments and has eight different positions to align selected passages in the rotatable member with selected passages in the valve body as described below. The indexing valve drive motor utilizes precise, high-frequency motion control for proper alignment in the eight positions. The indexing valve drive motor may have a built-in timer to control the time duration of each position of the rotatable internal member; alternatively, an external timer may be used or timing may be communicated from a programmable logic controller (PLC) or a computer control system (not shown). The indexing valve motor may also have a brake on the shaft to minimize coasting of the rotor.

Gas flows at the feed ends of the adsorbent vessels are directed by indexed rotatable multi-port valves 229 and 231, each of which has four external ports and one inlet or outlet port. The rotatable internal members of valves 229 and 231 are rotated by indexing valve drive motor 233, which moves each member intermittently in a single rotary direction with precise 90 degree increments and has four different positions to align a passage in the rotatable member with selected passages in the valve body as described below. The indexing valve drive motor utilizes precise, high-frequency motion control for proper alignment in the four positions. The indexing valve drive motor may have a built-in timer to control the time duration of each position of the rotatable internal member; alternatively, an external timer may be used or timing may be communicated from a programmable logic controller (PLC) or a computer control system (not shown) that controls both indexing valve drive motors 227 and 233. In another alternative, indexing valve drive motor 227 may have a built-in timer that controls both indexing valve drive motors 227 and 233, thereby ensuring that the indexed movement of valves 217, 229, and 231 is always synchronized and consistent. The indexing valve motor may also have a brake on the shaft to minimize coasting of the rotor.

The external ports of indexed rotatable multi-port valve 229 are connected via lines 235, 237, 239, and 241, respectively, to inlet/outlet lines 243, 245, 247, and 249 at the feed ends of adsorbent vessels 101, 103, 105, and 107, respectively. The inlet port of indexed rotatable multi-port valve 229 is connected via feed line 251 to feed gas aftercooler 119 and serves to deliver in pressurized feed gas to the adsorbent vessels. As described later, indexed rotatable multi-port valve 229 has an internal rotatable member having internal passages adapted to deliver pressurized feed gas to each of adsorbent vessels 101, 103, 105, and 107 in turn according to the PSA operating cycle.

The external ports of indexed rotatable multi-port valve 231 are connected via lines 253, 255, 257, and 259, respectively, to inlet/outlet lines 243, 245, 247, and 249 at the feed ends of adsorbent vessels 101, 103, 105, and 107, respectively. The outlet port of indexed rotatable multi-port valve 231 is connected waste gas line 261 to vacuum blower 111 and serves to withdraw waste gas from the adsorbent vessels. As described later, indexed rotatable multi-port valve 231 has an internal rotatable member having internal passages adapted to withdraw waste gas from each of adsorbent vessels 101, 103, 105, and 107 in turn according to the PSA operating cycle.

Figure 3:
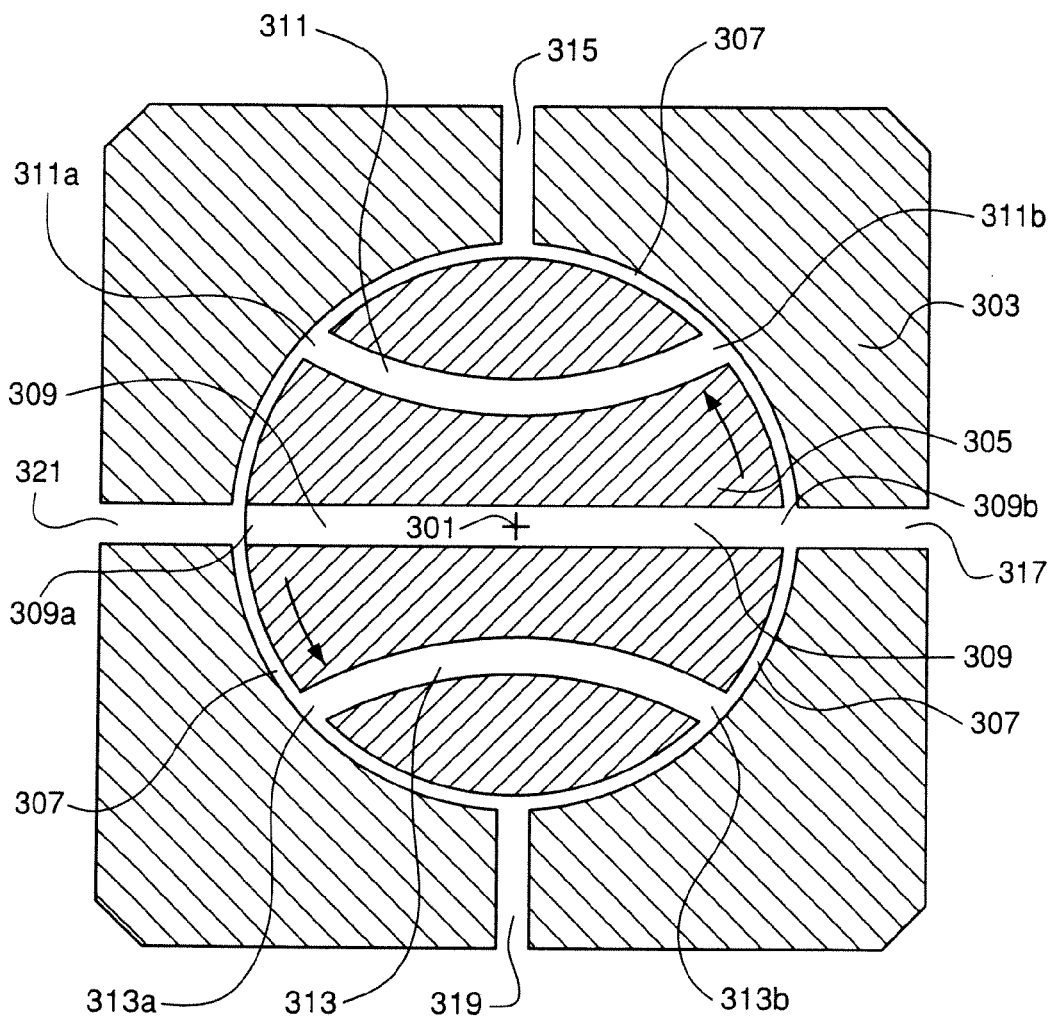
FIG. 3 is a cross-section of an indexed rotatable multi-port valve used in an embodiment of the present invention.

An example of indexed rotatable multi-port valve 217 is illustrated in the cross-sectional view of FIG. 3. This section is perpendicular to the rotational axis of the valve that passes through center point 301. The valve comprises valve body 303 and internal rotatable member 305 disposed within a valve body internal cavity that has the same general shape as rotatable member 305. Circumferential or annular space 307 contains sealing elements such as packing, O-rings, gaskets, or other elastomeric material (not shown) adapted to prevent the flow of gas between valve body 303 and rotatable member 305. The sealing elements are disposed between and seal the mating curved surfaces of valve body 303 and internal rotatable member 305. The packing, O-rings, gaskets, or other elastomeric material should have a low coefficient of friction to allow sealable sliding contact between this material and the outer surface of the rotatable member and/or the inner surface of the valve body internal cavity.

Internal rotatable member 305 has central bore or passage 309 that passes through the member, offset bore or passage 311 that passes through a region on one side of passage 309, and offset bore or passage 313 passing through a region on the other side of passage 309. Central passage 309 has first end 309a and second end 309b, offset passage 311 has first end 311a and second end 311b, and offset passage 313 has first end 313a and second end 313b. Valve body 303 has four passages 315, 317, 319, and 321 that extend from circumferential or annular space 307 through the outer surfaces of valve body 303. Internal rotatable member 305 and the internal cavity of the valve body have circular cross sections that are concentric and perpendicular to the axis of rotation of rotatable member 305.

The indexed rotatable multi-port valve described above differs from a rotary valve typically used in PSA systems because (1) the rotatable multi-port valve rotates intermittently whereas a rotary valve rotates continuously and/or (2) the opposing surfaces between the rotatable member and the valve body are curved and non-planar whereas the opposing surfaces between the rotor and stator in a rotary valve are flat and planar. In any of the embodiments, the three passages may lie in the same plane as illustrated in FIG. 3 or may lie in different planes. The passages may lie at any angle relative to the rotational axis of rotatable member 305 but cannot be parallel to this rotational axis. The three passages may have different effective cross-sectional flow areas, and these cross-sectional flow areas may be sized to control the flow rate of gas between beds during a given step. In the particular four bed process described in FIG. 5, for example, the central passage 309 may be larger than either passage 311 or 313. In general, any one of the first, second, and third passages may have a different cross-sectional flow area than either of the other two passages.

The exemplary indexed rotatable multi-port valve of FIG. 3 is adapted to operate intermittently wherein the passages in rotatable member 305 register with or are aligned with selected passages in valve body 303 in eight different indexed positions as follows.

1. A first indexed position is shown in FIG. 3 in which first end 309a of passage 309 is aligned with passage 321 in the valve body and second end 309b is aligned with passage 317 in the valve body during a first time period. In this first position, a path is provided for fluid flow communication between passages 309, 317, and 321, and the ends of passages 311, 313, 315, and 319 are sealed by contact with the sealing elements in annular space 307.
2. A second indexed position is set by turning rotatable member 305 in a counterclockwise direction by 45 degrees from the position in FIG. 3 so that during a second time period (1) first end 311a of passage 311 is aligned with passage 321 and second end 311b is aligned with passage 315 and (2) first end 313a of passage 313 is aligned with passage 319 and second end 313b is aligned with passage 317. In this second position, a path is provided for fluid flow communication between passages 311, 315, and 321, and a path is provided for fluid flow communication between passages 313, 317, and 319. The ends of passage 309 are sealed by contact with the sealing elements in annular space 307.
3. A third indexed position is set by turning rotatable member 305 in a counterclockwise direction by another 45 degrees from the second position so that first end 309a of passage 309 is aligned with passage 319 and second end 309b is aligned with passage 315 during a third time period. In this third position, a path is provided for fluid flow communication between passages 309, 315, and 319, and the ends of passages 311, 313, 317, and 321 are sealed by contact with the sealing elements in annular space 307.
4. A fourth indexed position is set by turning rotatable member 305 in a counterclockwise direction by another 45 degrees from the third position so that during a fourth time period (1) first end 311a of passage 311 is aligned with passage 319 and second end 311b is aligned with passage 321 and (2) first end 313a of passage 313 is aligned with passage 317 and second end 313b is aligned with passage 315. In this fourth position, a path is provided for fluid flow communication between passages 311, 319, and 321, and a path is provided for fluid flow communication between passages 313, 315, and 317. The ends of passage 309 are sealed by contact with the sealing elements in annular space 307.
5. A fifth indexed position is set by turning rotatable member 305 in a counterclockwise direction by another 45 degrees from the fourth position so that first end 309a of passage 309 is aligned with passage 317 and second end 309b is aligned with passage 321 during a fifth time period. In this fifth position, a path is provided for fluid flow communication between passages 309, 317, and 321, and the ends of passages 311, 313, 315, and 319 are sealed by contact with the sealing elements in annular space 307.
6. A sixth indexed position is set by turning rotatable member 305 in a counterclockwise direction by another 45 degrees from the fifth position so that during a sixth time period (1) first end 311a of passage 311 is aligned with passage 317 and second end 311b is aligned with passage 319 and (2) first end 313a of passage 313 is aligned with passage 315 and second end 313b is aligned with passage 321. In this sixth position, a path is provided for fluid flow communication between passages 311, 317, and 319, and a path is provided for fluid flow communication between passages 313, 315, and 321. The ends of passage 309 are sealed by contact with the sealing elements in annular space 307.
7. A seventh indexed position is set by turning rotatable member 305 in a counterclockwise direction by another 45 degrees from the sixth position so that first end 309a of passage 309 is aligned with passage 315 and second end 309b is aligned with passage 319 during a seventh time period. In this seventh position, a path is provided for fluid flow communication between passages 309, 315, and 319, and the ends of passages 311, 313, 317, and 321 are sealed by contact with the sealing elements in annular space 307.
8. An eighth indexed position is set by turning rotatable member 305 in a counterclockwise direction by another 45 degrees from the seventh position so that during an eighth time period (1) first end 311a of passage 311 is aligned with passage 315 and second end 311b is aligned with passage 317 and (2) first end 313a of passage 313 is aligned with passage 321 and second end 313b is aligned with passage 319. In this fourth position, a path is provided for fluid flow communication between passages 311, 315, and 317, and a path is provided for fluid flow communication between passages 313, 319, and 321. The ends of passage 309 are sealed by contact with the sealing elements in annular space 307.

Following the eighth position, rotatable member 305 is turned in a counterclockwise direction by another 45 degrees and returns to the first indexed position. As an alternative to the counterclockwise rotation described above, rotatable member 305 may be rotated from the first position in a clockwise direction, in which case the positions described above would be in the reverse order. Each of these eight positions corresponds to a respective process step in the PSA cycle described below.

It should be appreciated from the above described sequence that rotation through eight indexed positions for a valve body 303 that contains only four passages provides for the isolation of pairs of beds from each other so that the product ends of the two beds are not in flow communication. This isolation allows the beds to participate in additional process steps such as evacuation or providing product.

The indexed rotatable multi-port valve of FIG. 3 operates intermittently such that each of the eight fixed positions described above is held for a predetermined time interval without rotation of rotatable member 305. Between each of these predetermined time intervals, the rotatable member rotates quickly from one position to the adjacent position during a brief rotational time interval that is much shorter than the time intervals of the eight fixed positions. Rotatable member 305 may be turned on its axis by a stepwise indexing motor that is controlled by a programmable timer according to the desired durations of the first through eighth time periods described above.

In one embodiment, the three-dimensional shapes of internal rotatable member 305 and the internal cavity of valve body 303 are generally spherical and concentric, and the parts form an assembly that may be described as a ball valve. In other embodiments, internal rotatable member 305 and the internal cavity of the valve body may be cylindrical, ellipsoidal, tapered, or any other shape that has a circular cross-section taken perpendicular to the rotational axis of rotatable member 305. The indexed rotatable multi-port valve illustrated in FIG. 3 may be fabricated using methods known, for example, in the art of manufacturing ball valves or rotary plug valves. Alternatively, a commercially-available ball valve or rotary plug valve may be modified by drilling additional passages in the rotatable member and/or the valve body to achieve the desired passage alignment and fluid flow paths.

Figure 4:
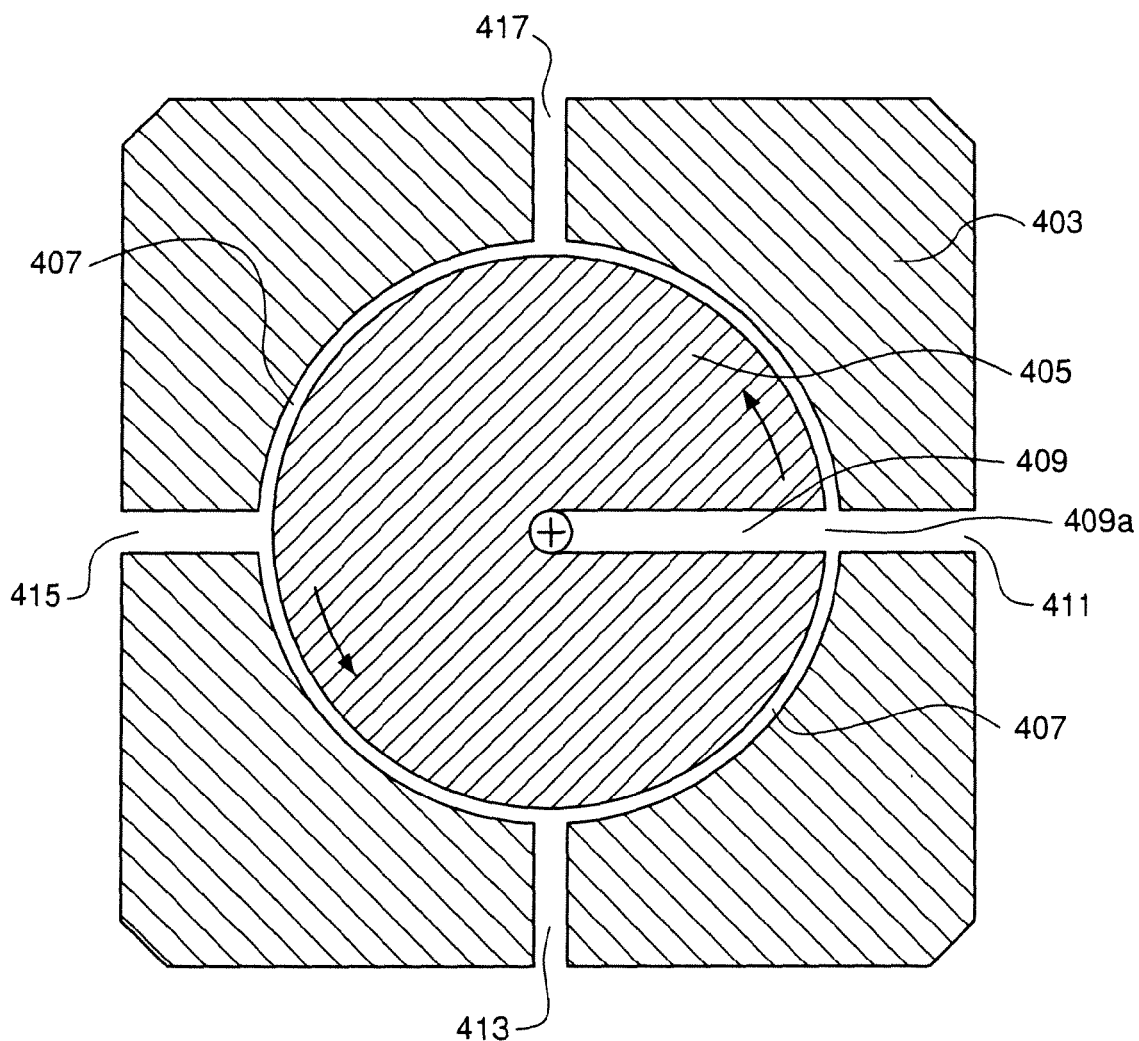
FIG. 4 is a cross-section of another indexed rotatable multi-port valve used in an embodiment of the present invention.

An example of indexed rotatable multi-port valves 229 and 231 of FIG. 2 is illustrated in the cross-sectional view of FIG. 4. This section is taken perpendicular to the rotational axis of the valve that passes through center point 401. The valve comprises valve body 403 and internal rotatable member 405 disposed within a valve body internal cavity that has the same general shape as rotatable member 405. Circumferential or annular space 407 contains sealing elements such as packing, O-rings, gaskets, or other elastomeric material (not shown) adapted to prevent the flow of gas between valve body 403 and rotatable member 405. The packing, O-rings, gaskets, or other elastomeric material should have a low coefficient of friction to allow sealable sliding contact between this material and the outer surface of the rotatable member and/or the inner surface of the valve body internal cavity.

Internal rotatable member 405 has central bore or passage 409 that passes from the outer surface at first end 409a to the center of the member, bends 90 degrees, follows the rotational axis of the member, and extends to the outer surface of the member at a second end 409b (not shown) located at the outer surface of the valve body below the plane of the sectional view of FIG. 4. The direction of a fluid flowing through central passage 409 thus changes by 90 degrees between first end 409a and second end 409b. Valve body 403 has four passages 411, 413, 415, and 417 that extend from circumferential or annular space 407 through the outer surfaces of valve body 403. Internal rotatable member 405 and the internal cavity of the valve body have circular cross sections that are concentric and perpendicular to the axis of rotation of rotatable member 405.

The exemplary indexed rotatable multi-port valve of FIG. 4 is adapted to operate intermittently wherein the passage in rotatable member 405 registers with or is aligned with the passages in valve body 403 in four different indexed positions as follows. A first indexed position is shown in FIG. 4 in which first end 409a of passage 409 is aligned with passage 411 during a first time period, thereby placing the two passages in fluid flow communication. A second indexed position is set by turning rotatable member 405 in a counterclockwise direction by 90 degrees from the position in FIG. 4 so that first end 409a is aligned with passage 417 during a second time period, thereby placing the two passages in fluid flow communication. A third indexed position is set by turning rotatable member 405 in a counterclockwise direction by 90 degrees from the second position so that first end 409a is aligned with passage 415 during a third time period, thereby placing the two passages in fluid flow communication. A fourth indexed position is set by turning rotatable member 405 in a counterclockwise direction by 90 degrees from the third position so that first end 409a is aligned with passage 417 during a fourth time period, thereby placing the two passages in fluid flow communication. Following the fourth position, rotatable member 405 is turned in a counterclockwise direction by 90 degrees from the third position to return to the first position. As an alternative to the counterclockwise rotation described above, rotatable member 405 may be rotated from the first indexed position in a clockwise direction, in which case the positions described above would be in the reverse order.

The indexed rotatable multi-port valve of FIG. 4 operates intermittently such that each of the four fixed positions described above are held for a predetermined time interval without rotation of rotatable member 405. Between each of these predetermined time intervals, the rotatable member rotates quickly from one position to the adjacent position during a brief rotational time interval that is much shorter than the time intervals of the eight fixed positions. Rotatable member 405 may be turned on its axis by a stepwise indexing motor that is controlled by a programmable timer according to the desired durations of the first through eighth time periods describer above.

In one embodiment, the three-dimensional shapes of internal rotatable member 405 and the internal cavity of valve body 403 are generally spherical and concentric, and the parts form an assembly that may be described as a ball valve. In other embodiments, internal rotatable member 405 and the internal cavity of the valve body may be cylindrical, ellipsoidal, tapered, or any other shape that has a circular cross-section taken perpendicular to the rotational axis of rotatable member 405. The indexed rotatable multi-port valve illustrated in FIG. 4 may be fabricated using methods known, for example, in the art of manufacturing ball valves or rotary plug valves. Alternatively, a commercially-available ball valve or rotary plug valve may be modified by drilling additional passages in the rotatable member and/or the valve body to achieve the desired passage alignment and fluid flow communication paths.

Based on the above descriptions with reference to FIGS. 3 and 4, an indexed rotatable multi-port valve may be defined as a valve comprising (a) a rotatable member adapted for rotation about an axis and having a first circular cross-section perpendicular to the axis, wherein the rotatable member comprises one or more passages through the rotatable member; (b) a valve body surrounding the rotatable member, wherein the valve body is coaxial with the rotatable member and has an inner surface and an outer surface, and wherein the valve body comprises a plurality of passages between the inner surface and the outer surface. An indexing valve drive motor is a motor adapted to rotate the rotatable member intermittently in a single rotary direction to place the rotatable member sequentially in a series of fixed circumferential or rotational positions about the periphery of the circular cross-section relative to the valve body to align selected passages in the rotatable member with selected passages in the valve body.

The indexed rotatable multi-port valves of FIG. 2 may be physically coupled to maintain synchronization required to follow a preset timing sequence. This sequence may be achieved by driving the rotatable members by a high speed, high cycle index AC motor driver or drivers wherein each driver is directly connected via a shaft-to-shaft coupling to an indexed rotatable multi-port valve. A two-position timer may be used to actuate the driver(s) rather than a costly programmable logic controller (PLC) device.

The AC motor driver or drivers may be controlled by a modular drive inverter that utilizes encoder feedback from the AC motor to position the indexed rotatable multi-port valve quickly, accurately, and reliably. The modular drive inverter is capable of operating reliably through millions of cycles per year, which is especially important in rapid-cycle PSA systems. The modular drive inverter can be programmed with internal timers and interlocks to interface with and control the PSA process cycle as well as related equipment such as blowers and instrumentation. Examples of this type of modular drive inverter are those manufactured by SEW-Eurodrive and known as Movidrive MDX61B inverters. These drives can use internal motor encoder feedback or receive feedback from external devices such as proximity switches to determine exact valve positioning.

The operation of the pressure swing adsorption system of FIG. 2 may be illustrated by a four-bed PSA process for the separation of oxygen from air to yield a product containing at least 80 vol % oxygen at 15 to 29/psia. The process may operate between a maximum pressure up to 29/psia and a minimum pressure as low as 2 psia. If higher product pressure is required, an optional booster compressor can be used to raise the product pressure to 125 psia or higher. In this process, each of adsorbent vessels 101, 103, 105, and 107 contains a bed of adsorbent material, which may include any known adsorbent for producing oxygen from air such as, for example, zeolites CaA, NaX, CaX, and LiX. In the case of X zeolites, the $SiO_2/Al_2O_3$ ratio may range from 2.0 to 2.5. In the case of ambient air feed, a pretreatment layer of adsorbent to remove water and/or $CO_2$ may be used. These pretreatment layer adsorbents may include alumina and NaX, as well as others known in the art. LiX zeolite with an $SiO_2/Al_2O_3$ ratio of 2.0 is preferred for the separation of oxygen from air and is known as LiLSX (Li Low Silica X). The LiLSX selectively adsorbs nitrogen at ambient or near-ambient temperature to yield an oxygen product containing at least 80 vol % oxygen at 15 to 29.7 psia. Oxygen product purity is preferably at least 90 vol % oxygen. The cycle may operate between a maximum pressure up to 29.7 psia and a minimum pressure as low as 2 psia.

An exemplary eight-step PSA cycle may be used as described below.

1. Introducing a pressurized feed gas into the feed end of a first adsorbent bed wherein the more strongly adsorbable component is removed by the adsorbent and the less strongly adsorbed component is withdrawn from a product end of the first adsorbent bed as product gas, all of which is final product gas sent to an optional final product gas holding tank and from there to a downstream user.
2. Continuing the introduction of feed gas into the feed end of the first adsorbent bed wherein the more strongly adsorbable component is removed by the adsorbent and the less strongly adsorbed component passes through the product end of the adsorbent bed as product gas, a portion of which is final product gas sent to the optional final product gas holding tank and from there to the downstream user, and another portion of which is introduced into the product end of another adsorbent bed undergoing countercurrent repressurization (step 8), and continuing until the adsorption front of the more strongly adsorbable component approaches the product end of the first adsorbent bed.
3. Cocurrently depressurizing the first adsorbent bed beginning at the bed pressure in step 2 by withdrawing depressurization gas from the product end of the bed while the pressure in the bed drops to a first intermediate pressure, wherein the depressurization gas is introduced countercurrently into the product end of an adsorbent bed undergoing pressure equalization (step 7).
4. Cocurrently depressurizing the first adsorbent bed beginning at the first intermediate pressure by withdrawing additional depressurization gas from the product end of the bed while the pressure in the bed drops to a second intermediate pressure, wherein the depressurization gas is introduced countercurrently into the product end of an adsorbent bed undergoing purge (step 6).
5. Depressurizing the first adsorbent bed countercurrently from the second intermediate pressure wherein void space and desorbed gas is withdrawn from the first adsorbent bed through the feed end to near atmospheric pressure as waste gas. The pressure may be further reduced to sub-atmospheric pressure by connecting gas flow outlet from the feed end of the first adsorbent bed to the suction end of a vacuum pump such that additional void space and desorbed gas is removed as additional waste gas.
6. Introducing a countercurrent purge gas from an adsorbent bed undergoing a second depressurization (step 4) into the product end of the first adsorbent bed and withdrawing a waste purge gas from the feed end of the first adsorbent bed down to a third intermediate pressure.
7. Countercurrently repressurizing the first adsorbent bed beginning at the third intermediate pressure by introducing pressurization gas into the product end of the first adsorbent bed up to a fourth intermediate pressure that is equal to or less than the first intermediate pressure, wherein the pressurization gas is provided from the product end of an adsorbent bed undergoing a first depressurization (step 3).
8. Countercurrently repressurizing the first adsorbent bed from the fourth intermediate pressure by introducing product gas into the product end of the first adsorbent bed, wherein the product gas is provided from the product end of an adsorbent bed undergoing step 2. At the end of this step, the first adsorbent bed is ready to begin step 1.

Steps 1 through 8 are repeated in a cyclic manner. In this example, the more strongly adsorbed component is nitrogen and the less strongly adsorbed component is oxygen, but the cycle may be used to separate other gas mixtures.

A cycle chart showing the eight-step process described above is given in Table 1 showing the relationship of the steps among the first bed described above (bed 1) and the other three beds (beds 2, 3, and 4).

TABLE 1

Cycle Chart for Four Bed PSA Process

| Bed | Process Step | | | | | | | |
|-----|---|---|---|---|---|---|---|---|
|     | 1 | 2 | 3 | 4 | 5 | 6 | 7 | 8 |
| 1   | 1 | 2 | 3 | 4 | 5 | 6 | 7 | 8 |
| 2   | 7 | 8 | 1 | 2 | 3 | 4 | 5 | 6 |
| 3   | 5 | 6 | 7 | 8 | 1 | 2 | 3 | 4 |
| 4   | 3 | 4 | 5 | 6 | 7 | 8 | 1 | 2 |

The duration of the all process steps 1-8 may be equal. Alternatively, steps 1, 3, 5, and 7 each may have a first equal duration and steps 2, 4, 6, and 8 each may have a second equal duration shorter or longer that the first duration. A typical total cycle time may be in the range of 20 to 300 seconds.

Figure 5:
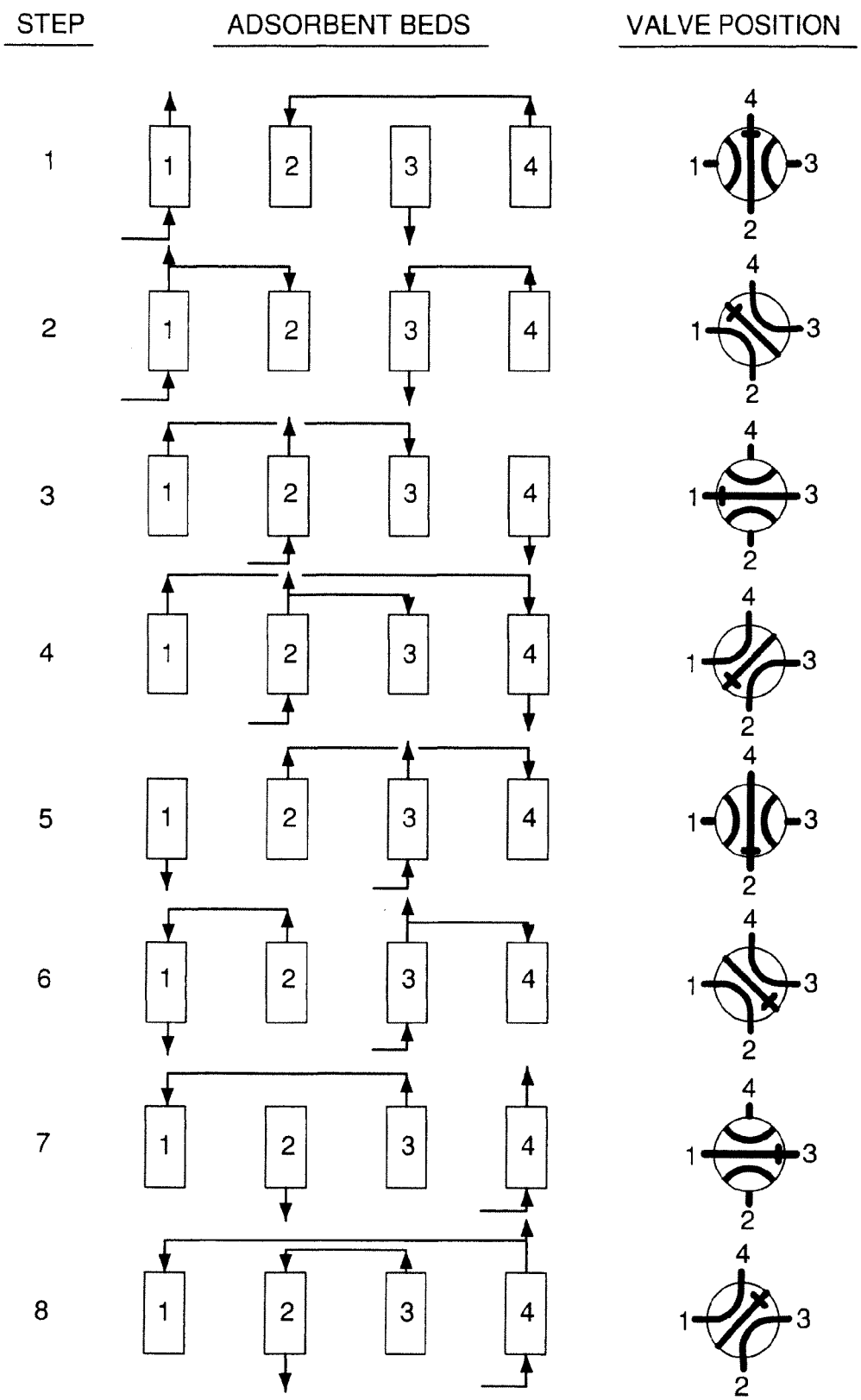
FIG. 5 is a graphical representation of steps 1-8 for a four-bed PSA cycle showing the cycle steps and respective positions of an indexed rotatable multi-port valve operating on the feed ends of the beds.

A graphical representation of PSA cycle steps 1-8 for beds 1-4 along with the respective positions of indexed rotatable multi-port valve 217 is given in FIG. 5 in which each of valve outlets 1, 2, 3, and 4 are in flow communication with the product end outlets of adsorbent beds 1, 2, 3, and 4, respectively. Valve outlets 1, 2, 3, and 4 correspond to the outlets of valve 217 of FIG. 2 that are connected to lines 219, 221, 223, and 225, respectively. Beds 1, 2, 3, and 4 of FIG. 5 correspond to vessels 101, 103, 105, and 107, respectively, of FIG. 2. Outlets 1, 2, 3, and 4 in the valve of FIG. 5 are in flow communication with valve body passages 319, 317, 315, and 321, respectively, of FIG. 3. The passages in the rotatable member valve of FIG. 5 correspond to passages 301, 311, and 313 of FIG. 3.

In step 1 of FIG. 5, the indexed rotatable multi-port valve places the product ends of beds 2 and 4 in flow communication. In step 2, the valve places the product ends of beds 1 and 2 in flow communication and the product ends of beds 3 and 4 in flow communication. In step 3, the valve places the product ends of beds 1 and 3 in flow communication. In step 4, the valve places the product ends of beds 1 and 4 in flow communication and the product ends of beds 2 and 3 in flow communication. In step 5, the valve places the product ends of beds 2 and 4 in flow communication. In step 6, the valve places the product ends of beds 1 and 2 in flow communication and the product ends of beds 3 and 4 in flow communication. In step 7, the valve places the product ends of beds 1 and 3 in flow communication. In step 8, the valve places the product ends of beds 2 and 3 in flow communication and the product ends of beds 1 and 4 in flow communication. The elapsed times during which the valve is fixed with no rotation in each of steps 1, 3, 5, and 7 are equal, and this sets the duration of these steps. The elapsed times that the valve is indexed in each of steps 2, 4, 6, and 8 are equal, and this sets the duration of these steps. The elapsed time of steps 1, 3, 5, and 7 may be equal to or different than the elapsed time of steps 2, 4, 6, and 8.

Valve 229 of FIG. 2 operates as a diverter valve by placing feed line 251 in flow communication with the feed end of bed 1 during steps 1 and 2, the feed end of bed 2 during steps 3 and 4, the feed end of bed 3 during steps 5 and 6, and the feed end of bed 4 during steps 7 and 8. Valve 231 of FIG. 2 operates as a diverter valve by placing waste gas line 261 in flow communication with the feed end of bed 3 during steps 1 and 2, the feed end of bed 4 during steps 3 and 4, the feed end of bed 1 during steps 5 and 6, and the feed inlet of bed 2 during steps 7 and 8.

In this cycle, purge gas is provided from a bed after the bed provides pressurization gas to another bed. In this sequence, the more strongly adsorbed component front is closest to the product end of the bed when purge gas is withdrawn, therefore making this gas more concentrated in the more strongly adsorbed component (i.e., "dirtier") than the pressurization gas. This "dirtier" purge gas is advantageous in this process, since subsequent countercurrent repressurization steps push the purge gas towards the feed end with gas that is less concentrated in the more strongly adsorbed component. It may be preferable in some cases to use "cleaner" gas for purging, and many known PSA cycles use product gas from a well-mixed product or surge tank for providing purge. In the process configuration of FIG. 2, however, it is not possible to provide purge gas from product tank 151 without using switching block valves and an associated controller. Since it is desired to eliminate the use of these valves, the provide purge gas step (step 4) follows the provide equalization pressurization gas step (step 3) in the PSA cycle described above. It has been found that this cycle with LiLSX can be used for the production of 3 to 10 ton/day of oxygen with a product purity of 90 vol % oxygen and an oxygen recovery of 60% and higher.

The use of indexed rotatable multi-port valves is illustrated above for a four-bed system operating in the described eight-step cycle, but valves of this type may be used in systems with other numbers of beds and other PSA cycles. This may be accomplished by selecting the proper number and alignment of the passages in the rotatable member and valve body and connecting the valves with the adsorbent vessels with an appropriately designed piping system. The indexed rotatable multi-port valves may be used in PSA systems for the separation of any gas mixture and is illustrated by the recovery of oxygen from air as described above. PSA separation systems with indexed rotatable multi-port valves may be used, for example, in the recovery of nitrogen from air, the recovery of hydrogen from hydrogen-containing mixtures, and the purification of helium.

EXAMPLE

A 4-bed oxygen pressure-vacuum swing adsorption system as illustrated in FIG. 2 produces 2500 liters per minute of product at purity of 90% oxygen at ambient temperature of 42° F. The system comprises two air movers driven by Baldor motors, a Tuthill 5509 rotary lobe blower for feed and a Tuthill 5518 rotary lobe blower for vacuum duty. The adsorber vessels contain a layer of NaX, comprising 20% of the bed height at the feed end of the vessel, and 80% bed height of LiX adsorbent; both adsorbents have an average particle diameter of about 1.8 mm. The adsorber columns are 30 in. in diameter and the total adsorbent bed height is 60 in. The feed gas is directed through a ball valve connected to the feed ends of the adsorber vessels. The vacuum gas is directed through a separate ball valve and is connected to the feed ends. At the product ends of the vessels, piping is connected from the vessels to a single indexed rotatable multi-port product valve that directs flow during the equalization and purge steps. The valve cycles through eight discrete positions during the process. The system is operated in an 8-step cycle where steps 1, 3, 5, and 7 have a duration of 7.0 seconds each, and steps 2, 4, 6, and 8 have a duration of 5.9 seconds each. The total cycle time is 52 seconds. The bed cycles from a minimum pressure of −12 inches Hg to a maximum pressure of 9 psig. The product pressure ranges from 7.5 to 9.0 psig.

The invention claimed is:

1. A method for the recovery of a less strongly adsorbable component from a feed gas mixture comprising a more strongly adsorbable component and the less strongly adsorbable component, wherein the method comprises:

(a) providing a pressure swing adsorption system comprising (1) two or more vessels, each having a feed end, a product end, and adsorbent material adapted to adsorb the more strongly adsorbable component from the feed gas mixture;

(2) piping adapted to introduce the feed gas mixture into the feed ends of the vessels, piping adapted to withdraw a product gas from the product ends of the vessels, wherein the product gas is depleted in the more strongly adsorbable component, piping adapted to place the product ends of any pair of vessels in flow communication, and piping adapted to withdraw a waste gas from the feed ends of the vessels, wherein the waste gas is enriched in the more strongly adsorbable component;

(3) a feed pipe adapted to supply the feed gas mixture to the system, a product pipe adapted to withdraw the product gas from the system, and a waste gas pipe adapted to withdraw waste gas from the system; and (4) an indexed rotatable multi-port product valve having a plurality of indexed rotational positions adapted to place the product ends of any pair of vessels in flow communication;

(b) introducing the feed gas mixture into a first vessel and withdrawing product gas from the first vessel and through the product pipe;

(c) depressurizing the first vessel by withdrawing depressurization gas from the product end of the vessel and transferring the depressurization gas to the product end of another vessel via the indexed rotatable multi-port product valve in one of the indexed rotational positions;

(d) withdrawing waste gas from the feed end of the first vessel;

(e) pressurizing the first vessel by introducing into the product end of the vessel a depressurization gas provided from another vessel that is undergoing step (c), wherein the gas is transferred via the indexed rotatable multi-port product valve in another of the indexed rotational positions; and (f) repeating steps (b) through (e) in a cyclic manner.

2. The method of claim 1 wherein the pressure swing adsorption system comprises an indexed rotatable multi-port feed gas valve having a plurality of indexed positions adapted to place the feed pipe in sequential flow communication with the feed end of each vessel, and wherein the feed gas in step (b) is introduced from the feed pipe into the feed end of the first vessel via the indexed rotatable multi-port feed gas valve in one of the plurality of indexed positions.

3. The method of claim 2 wherein the pressure swing adsorption system comprises an indexed rotatable multi-port waste gas valve having a plurality of indexed positions adapted to place the waste gas pipe in sequential flow communication with the feed end of each vessel, and wherein the waste gas in step (d) is withdrawn from the feed end of the first vessel into the waste gas pipe via the indexed rotatable multi-port waste gas valve in one of the plurality of indexed positions.

4. The method of claim 1 wherein the feed gas mixture is air, the less strongly adsorbable component is oxygen, and the more strongly adsorbable component is nitrogen.

* * * * *